US010275915B2

United States Patent
Benavides et al.

(10) Patent No.: US 10,275,915 B2
(45) Date of Patent: Apr. 30, 2019

(54) METHOD AND SYSTEM FOR VISUALIZATION OF POSITION DATA

(71) Applicants: Miguel Benavides, New York, NY (US); Fabrizio Augusto Poltronieri, Karlsruhe (DE)

(72) Inventors: Miguel Benavides, New York, NY (US); Fabrizio Augusto Poltronieri, Karlsruhe (DE)

(*) Notice: Subject to any disclaimer, the term of this patent is extended or adjusted under 35 U.S.C. 154(b) by 119 days.

(21) Appl. No.: 15/260,779

(22) Filed: Sep. 9, 2016

(65) Prior Publication Data

US 2017/0076479 A1 Mar. 16, 2017

Related U.S. Application Data

(60) Provisional application No. 62/216,488, filed on Sep. 10, 2015.

(51) Int. Cl.

*B61L 25/02* (2006.01)
*G06T 11/60* (2006.01)
*G06T 11/20* (2006.01)
*G01S 19/14* (2010.01)

(52) U.S. Cl.

CPC .............. *G06T 11/60* (2013.01); *B61L 25/02* (2013.01); *G01S 19/14* (2013.01); *G06T 11/203* (2013.01); *G06T 2200/24* (2013.01)

(58) Field of Classification Search

None

See application file for complete search history.

(56) References Cited

U.S. PATENT DOCUMENTS

| | | | | |
|---|---|---|---|---|
| 6,662,016 | B1 | 12/2003 | Buckham et al. | |
| 2004/0218894 | A1 | 11/2004 | Harville et al. | |
| 2005/0278371 | A1 | 12/2005 | Funk et al. | |
| 2006/0223518 | A1 | 10/2006 | Haney | |
| 2008/0201385 | A1 | 8/2008 | Winberry et al. | |
| 2009/0281719 | A1 | 11/2009 | Jakobson | |
| 2010/0079336 | A1 | 4/2010 | Skibiski et al. | |
| 2011/0093195 | A1 | 4/2011 | Chiba et al. | |
| 2012/0303263 | A1* | 11/2012 | Alam | G01C 21/32 701/410 |
| 2013/0144523 | A1 | 6/2013 | Haney | |

(Continued)

OTHER PUBLICATIONS

Summerson, "Runtastic Releases a Pair of Cycling Apps for Road and Mountain Bikers", Apr. 22, 2013, URL: https://www.androidpolice.com/2013/04/22/runtastic-releases-a-pair-of-cycling-apps-for-road-and-mountain-bikers/.*

(Continued)

*Primary Examiner* — David H Chu

(74) *Attorney, Agent, or Firm* — Gottlieb, Rackman & Reisman, P.C.

(57) ABSTRACT

A method and system for visualization of position data is disclosed in which a user of a GPS-enabled smart device is assigned the role of a virtual paint brush. User location information and brush stroke parameters are used to generate brush stroke traces on a virtual canvas. Position data can be collected in real time or combined with historic data and modified according to predefined criteria before use in the visual display. Position information from other users having their own brush stroke attributes can be received and used to create an interactive and generally real-time multi-user display on the virtual canvas.

19 Claims, 16 Drawing Sheets

(56) References Cited

U.S. PATENT DOCUMENTS

| | | | | |
|---|---|---|---|---|
| 2014/0062777 | A1* | 3/2014 | MacGougan | G01S 19/26 342/357.43 |
| 2014/0088860 | A1 | 3/2014 | Poornachandran et al. | |
| 2016/0223577 | A1* | 8/2016 | Klosinski, Jr. | G01P 3/50 |
| 2017/0255966 | A1* | 9/2017 | Khoury | G08G 1/0129 |

OTHER PUBLICATIONS

Allen, "Runtastic PRO Review", Apr. 17, 2014, URL: http://www.148apps.com/reviews/runtastic-pro-review/.*

Google Developers, "Snappy travels with the Roads API", Mar. 4, 2015, URL: https://www.youtube.com/watch?v=e5YDb-XnDVk.*

Schwartz, "Find Road & Map Errors on Google Maps? How to Report Them", Feb. 27, 2007, URL: https://www.seroundtable.com/archives/012529.html.*

Bryan, "8 Fitness Apps That Use Your Friends (for motivation)", Dec. 21, 2012, URL: https://everymove.org/blog/8-fitness-apps-that-use-your-friends.*

Sawers, "Runtastic now invites you to beat your previous times, and shows your runs on Street View too", Jun. 11, 2014, URL: https://thenextweb.com/apps/2014/06/11/runtastic-now-invites-beat-previous-times-shows-runs-street-view/.*

Callham, "Runtastic Pro available for free for Windows Phone users for a limited time", Jan. 10, 2015, URL: https://www.windowscentral.com/runtastic-pro-available-free-windows-phone-users-limited-time.*

International Search Report, U.S. Patent and Trademark Office, Application No. PCT/US2016/051038, dated Nov. 18, 2016; pp. 1-2.

Written Opinion of the International Searching Authority, U.S. Patent and Trademark Office, Application No. PCT/US2016/051038, dated Nov. 18, 2016; pp. 1-10.

Map My Walk; http://walkmywalk.com/app; May 10, 2015; pp. 1-4.

* cited by examiner

REGULAR ENTRY:

{
"address": "Southeast, NY",
"city": "Southeast",
"datetime": "2015-10-10 22:21:20.281 EDT",
"doc_type": "drawing_data",
"epoch_timestamp": 1444530080,
"former_position_lat": 41.3887486,
"former_position_lng": -73.5921451,
"gmt_date_time": "2015-10-11 02:21:20.283 GMT+00:00",
"elevation": 13.861694335938,
"lat": 41.3887432,
"lineDrawColor": -2286337,
"lineID": "8981c367-7bdb-4ae9-bc39-88e011807cb9",
"lineStrokeWidth": 9,
"lng": -73.5921351,
"session": "93fc01e2-b704-4b31-bf92-20c13db0f430",
"user": "23b5589a8eb68c7db3575d3a8ebdc061d808549315e814
4f667039832e9fa7b8b8e3e70b2579357b095a5033eeb9a94ecae9cfe05c0
d2450b5b3fc211284fc2c"
}

FIG. 7A

DRAW TOGETHER:
{
"dateTime": "2016-02-23 22:18:05.300 CET",
"doc_type": "drawing_together",
"epoch_timestamp": 1456262285,
"gmt_date_time": 2016-02-23 21:18:05.301 GMT+00:00",
"line_ID_draw_together": "b5f1245a-5a4d-409e-8362-61683c1b890e",
"polyline_draw_together":
{
"clickable": false,
"color": -12142592,
"geodesic": false,
"points":
[
{
"elevation": 13.861613335673,
"latitude": 49.0095511,
"longitude": 8.3748473,
},
{
"elevation": 13.861413565688,
"latitude": 49.0095528,
"longitude": 8.3748478,
}
],
"visible: true,
"width":11,
"zindex":0
},
"session_draw_toghter ": "8b0717a4-9f65-4b41-a6b2-2484c53c1a63", "user_draw_together": "67cf04d94ce2396739edbe422ce6a29ae4cf28eb79bb13c5fd73829aeafc59d2af19c174ce196ca413b1f10ac9df6fa3afc323d227851c5acb643457aa7ed64b"
}

FIG. 7B

METHOD AND SYSTEM FOR VISUALIZATION OF POSITION DATA

CROSS-REFERENCE TO RELATED APPLICATIONS

This application claims priority to U.S. provisional application Ser. No. 62/216,488 filed on Sep. 10, 2015, the entire contents of which is expressly incorporated by reference.

BACKGROUND

Many smart devices, such as cell phones, PDAs, and tablet devices, include GPS technology which allows the coordinate position of the device to be easily determined. A user of the device can use conventional software, such as a Google Maps™ API, to process the GPS coordinates and display the device's position overlaid on a map. Mapping software can also be used to plan a travel route between two-points and display the route on a map. The mapping software can be stored locally in the device or accessed remotely over a wireless data link using cellular, WiFi or other protocols.

Embedded GPS technology has also been used to in conjunction with exercise programs. A user can plan an exercise route, e.g., for walking or biking, which is then shown on a map. Software using the GPS location data tracks the user's location along that route and calculates information such as distance traveled, speed, and calories burned. The software can also record and display a route taken by a user and this information can be accessed by the user or others at a later time.

Despite the various ways in which GPS position data from a smart device has been used and displayed, existing systems are not well suited for utilizing the position data to generate artistic or other works on a virtual canvas using real time and historic data. Existing systems lack the ability to allow such an application on a multi-user basis in which multiple parties can cooperate in real time to generate a combined visual work on a virtual canvas

SUMMARY

These and other needs are addressed by a method and system in which a user of a GPS-enabled smart device is assigned the role of a virtual paint brush. The user selects a color, stroke width, and other brush parameters or features. Software on their smart device, alone or in combination with remote systems, converts the coordinate position of the user into one or more brush strokes on a virtual canvas. The canvas can reflect the real world, such as a 2D or 3D map overlaid by the brush strokes, or can reflect other virtual or imaginary environments. A user's position can be recorded in real time and combined with historic data for that user. In addition, the user's movement-related brush strokes can be combined with those of other users of the system. Each of those users can specify their own brush stroke parameters and the combined result is interactive and engaging environment for multiple users. Additional features and aspects of the invention can be used for other forms of entertainment and interactive applications.

BRIEF DESCRIPTION OF THE DRAWINGS

FIGS. 7A and 7B show sample database entries for a regular user session data point and from a Draw Together session.

DESCRIPTION OF EMBODIMENTS OF THE INVENTION

A method and system for generating a visual display on a virtual canvas allows one or no individuals to create participatory artwork. The method and system can be implemented in a software application which can be loaded into a conventional cell phone, tablet, PDA, or other smart device which includes UPS functionality. The software can work independently or in conjunction with software and data stored remotely and which is accessible via a network.

According to one aspect of the present invention, a software and hardware platform is provided in which a user of a GPS-enabled smart device is assigned the role of a virtual paint brush having assignable parameters such as a color, stroke width, and other features. Location data of the user is captured and used to create artwork on a virtual canvas comprising one or more brush strokes generated from the user's position, either singly, or combined with virtual brush strokes from other users of the method and system.

Figure 1:
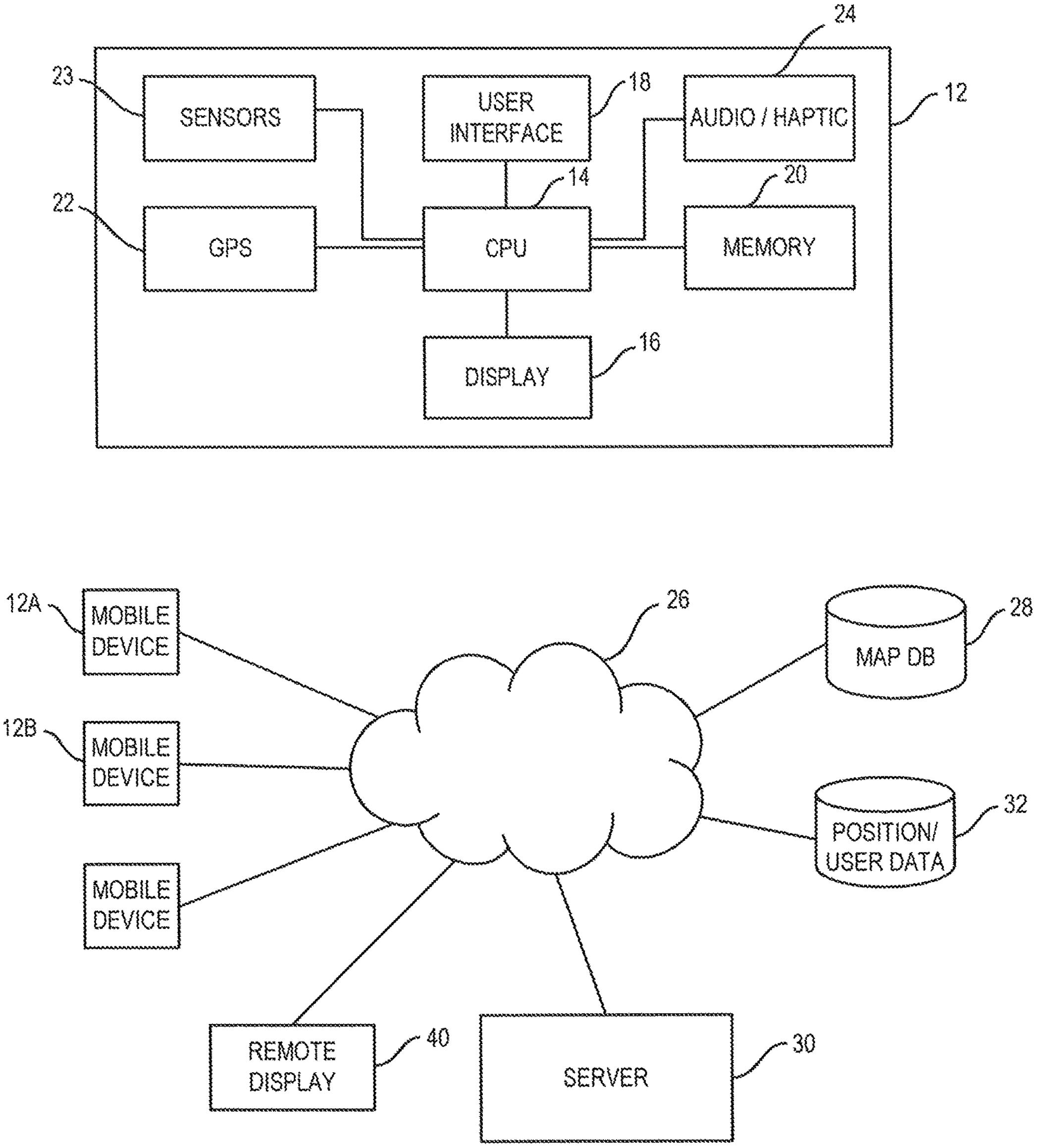
FIG. 1 is a high level block diagram showing system hardware for implementing an embodiment of the present invention.

FIG. 1 is a high level diagram illustrating the components comprising one embodiment of a system 10 for implementing aspects of the present invention. System 10 includes user devices 12, 12*a*, 12*b*, etc. Each user device 12 is a computing device, such as a smart phone, tablet, or other computer with a CPU 14, a display 16, a user input device 18 (which can be a keyboard, touch screen input or other device), digital memory 20 for storing software and data, and a GPS unit 22 or other device for determining the position of the device 12. User device 12 can further include one or more sensors 23, such as a motion or tilt sensor. User device 12 can also include a wireless interface 24 to permit data communication with a remote device, and non-visual output device(s) 24, such as a speaker or haptic output like a vibration device. Preferably the GPS unit 22 can determine location in three dimensions. The GPS unit 22 can be integrated with the mobile device 12 or can be an external GPS module connected using a wired connection or a wireless connection such as via Bluetooth. Such an external GPS module can be a stand-alone GPS unit or can be part of a device with additional functionality, such as a watch or wristband that includes GPS.

In operation, the software can display a brush stroke on a virtual canvas where the path of the brush (also referred to as a trace) is determined by the position of the user during a given window of time. In one embodiment, the user can select a preferred brush stroke attribute, such as color, stroke width, and other visual attributes for the trace and can change them as desired. When the trace is displayed, the trace is generated using the brush attributes associated with the respective position data points. The brush attributes can be changed by the user so that different points are associated with different attributes.

Preferably, the location data is captured in three dimensions and the trace is displayed using conventional 3D visualization software permitting the user to choose or alter the viewing perspective from which the trace is displayed, such as by panning, rotating, or zooming. The virtual canvas on which the trace can be shown can be a plain background or other virtual 2D or 3D environment. In one implementation, the trace is overlaid on a map to reflect actual, as opposed to relative, general positions. A displayed 3D trace can also be combined with other 3D models. Preferably, the trace data is shown in combination with a 3D model of the associated geographic area. However, other 3D models can also be used. In one embodiment, the 2D and 3D maps for the local environment can be obtained by accessing a map database 28 via a network 26. (FIG. 1). One suitable source of map information is Google Maps™ which can be accessed using an appropriate API. Other GPS libraries may also be suitable or preferred depending on the geographic coverage of the map library.

On a periodic basis, the position of the user's device is determined and stored with a time stamp or other meta-data that allows the order in which the location samples were taken to be determined. Location data can be collected at intervals such as once every second or several seconds or once every set number of minutes. Alternatively, the software can adjust the frequency at which location data is captured according to the system load, detected motion of the device, or other conditions. Preferably, there are minimum and maximum boundaries set on the location collection frequency.

The trace can reflect the user's relative or absolute position during a specified time interval, such as a prior number of hours or from the start of the session. The trace can be updated in real or near-real time such that as time progresses, new position data is added at the head of the trace and data that has expired (if such a feature is selected) is removed from the tail of the trace. The resulting displayed trace reflects the position during a generally fixed interval of time. Alternatively, the tail end of the trace can be retained and the length of the trace allowed to grow throughout an entire interactive session.

Although the application can be implemented on a standalone unit, preferably the user's device 12 works in conjunction with a remote system that can store the user's position and other data and that allows multiple users to access and share data. Returning to FIG. 1, the user device 12 can be connected via network 26 to a remote server 30 that is connected to a local or remote database 32 that can store position data. Preferably database 32 is a database suitable for storing multimedia objects. In operation, a user would login to the system using appropriate credentials and would then be able to store and access position and other data for themselves and for other users assuming permission has been given.

The server 30 (directly or through an intermediate interface) allows devices 12 and other devices such as a remote computer with display device 40, to connect to the system. In addition to access to server data and functionality through the application on a user device, in a particular embodiment, the server 30 can also be accessed using web browsing software via a web page interface at the server. Users logging in to the server 30 via the web page can access and display their historic position data (which can be stored in the remote storage 32) without running the App on their cell phone or other user device 12. The trace and background data could be generated using software executed on the server and provided to a remote user device for display. The data for other users associated with a user logging in to the server may also be displayed. For example, a connecting user may be given access to data from participating Facebook friends or to other users in a defined set.

Although the trace could be displayed in a way that rigorously shows the specific location of a user over time, this level of precision is unnecessary when presenting the location data for artistic purposes rather than, for example, navigation or monitoring purposes. In one embodiment, the trace can correspond closely, or alternatively only somewhat closely, to the user's actual position. Because the position data is captured at discrete (fixed or varying) intervals, a display decision can be made as to how the trace should be generated between the points. For example, the user could be given an option to connect position by straight lines or to use a curve fitting algorithm to provide a trace without any sharp corners. The trace data can be derived by combining location data with other information to generate a more abstract trace display that is only partially dependent on the position data. For example, the drawn connections between data points could vary between straight or jagged depending on external factors such as the weather, financial market or political volatility, the time of day, or other external non-position data. Likewise, the positions of the data points themselves could be adjusted based on external factors. For example, a given data point could be offset in two or three dimensions by a random percentage determined by external factors. If it is desired that the trace more closely adheres to features on a map, the GPS coordinate data can be adjusted relative to feature on the map to, for example, align in the center of the closest street.

In a further variation, traces for the same user but at different specified times can be shown simultaneously. Thus, for example, a display could show five different traces, each generated from location data for the user during each day of the work week. When multiple traces are shown, preferably the traces can be adjusted in a manner similar to that for individual traces, for example by limiting each trace to a specified window of time, or in how the trace is drawn between specific location data points.

In a further embodiment for a multi-user environment, groups can be defined where members of the group can 'draw together'. Each user device sends position data to a central server and that server will forward relevant data to the others users in the group. Location data from one or more users can then be accessed on a given user's device and traces for each user generated, preferably with the user's selected brush attributes at the time of the location data capture, and shown superimposed on a virtual canvas. Each group member would preferably receive the data of the others such that each would be able to view substantially the same result in near real-time.

Users can define groups manually or with reference to other data. For example, a group can be defined which includes users that meet specific characteristics, such as users that are 'friends' with a specified user in a social network. In a second example, a group can be defined with users that come near a specific location at any time or are at that location only within a specified time period.

Figure 8B:
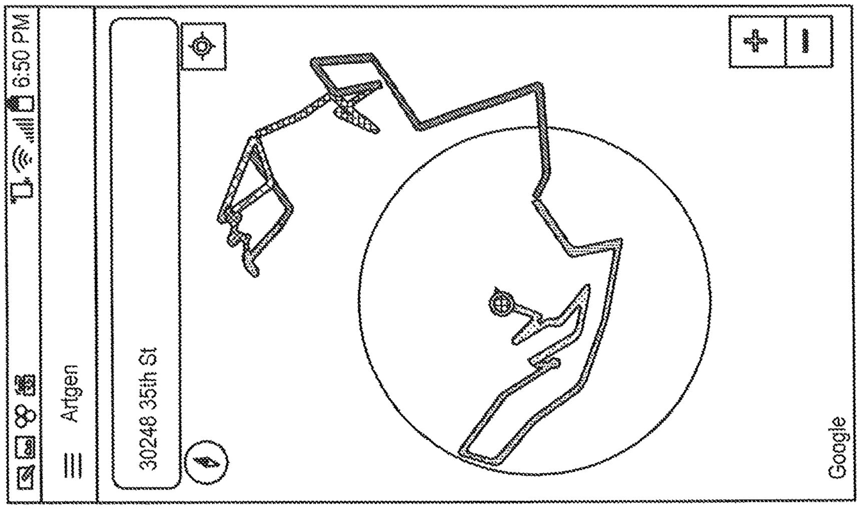
FIGS. 8A-8H show screen displays of different user traces for single users and in a draw together session.
Figure 8A:
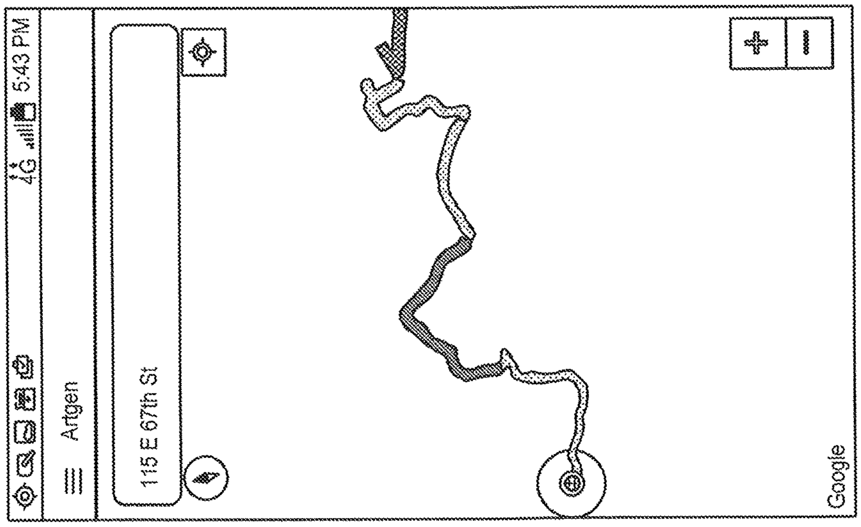
Figure 8C:
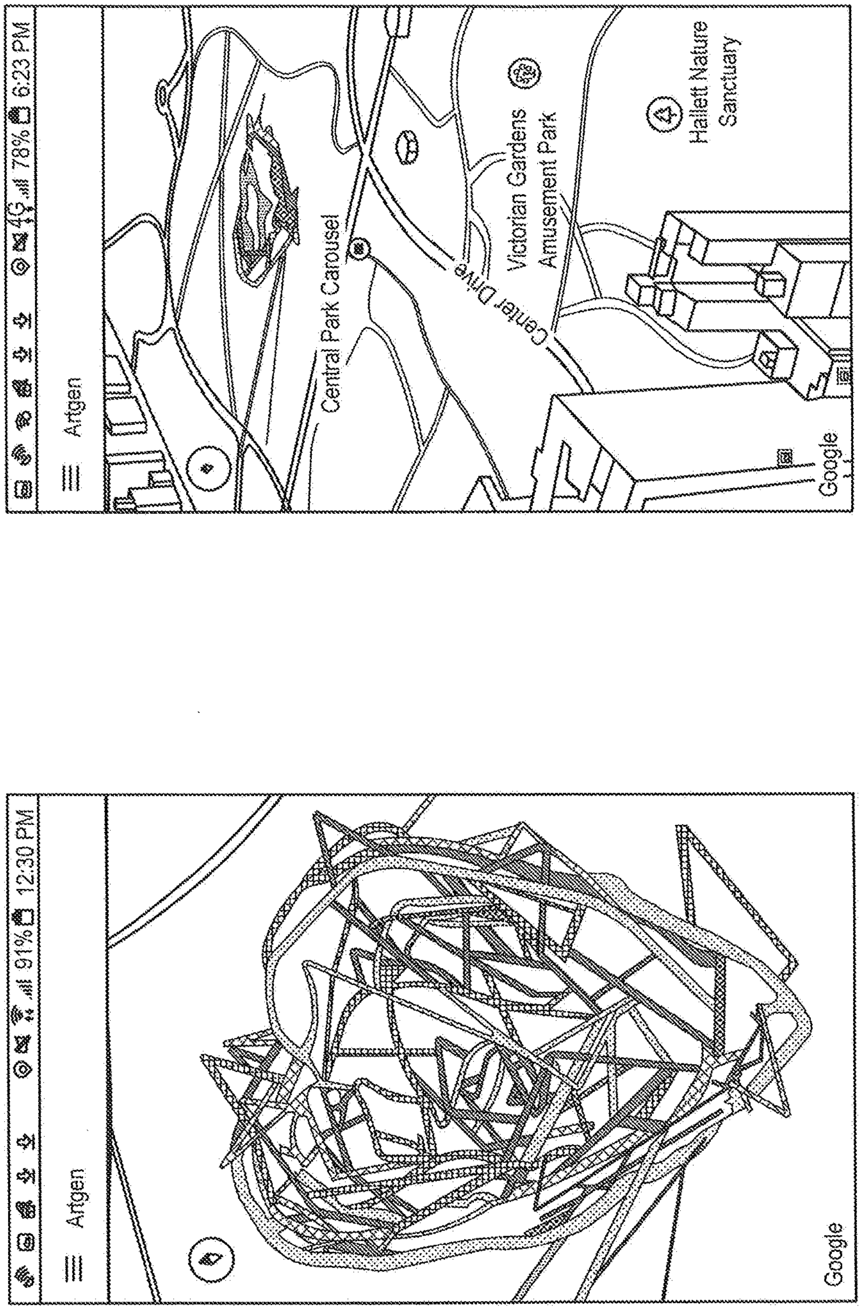
Figure 8D:
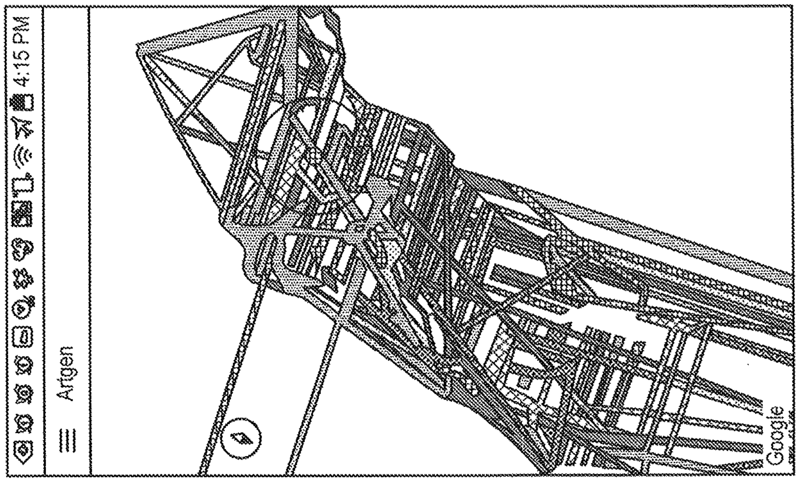
Figure 8E:
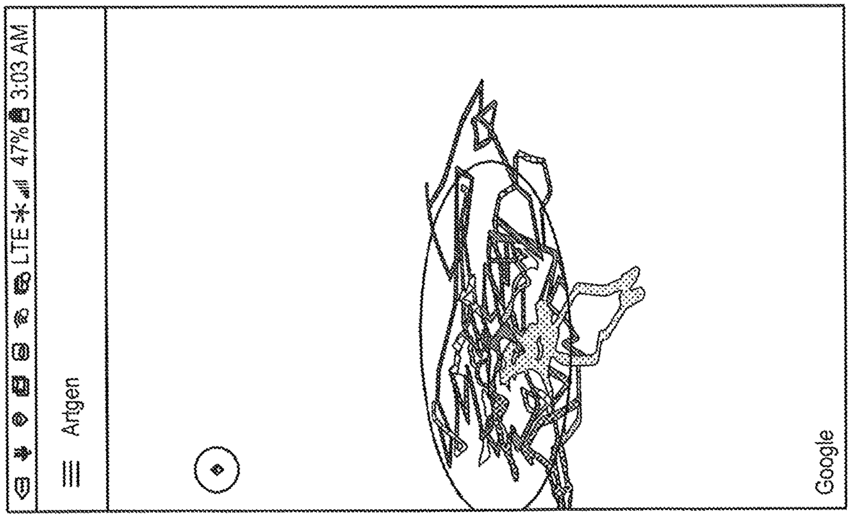
Figure 8F:
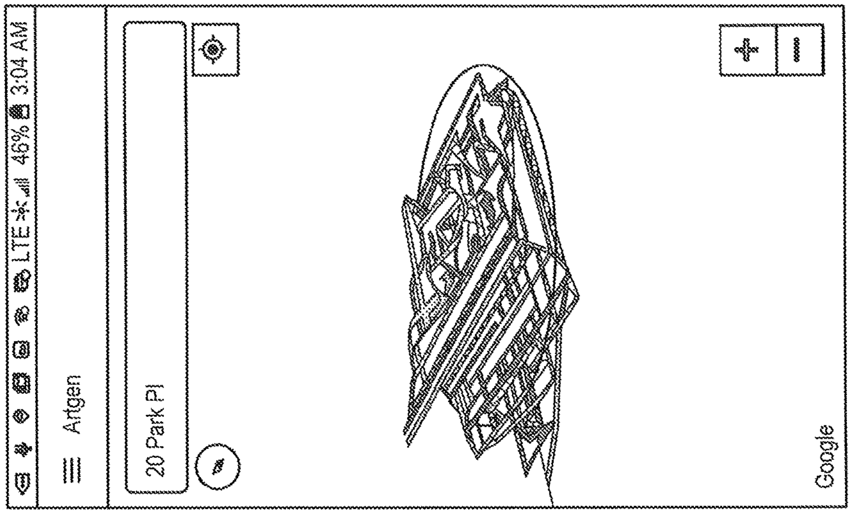
Figure 8H:
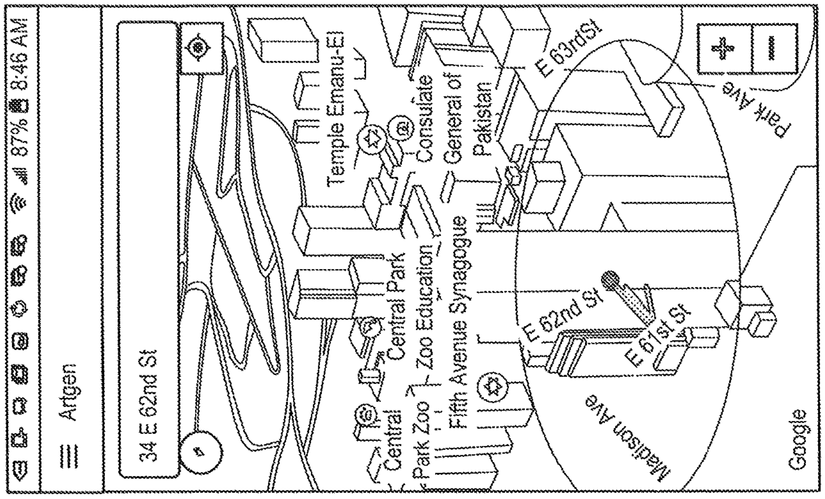
Figure 8G:
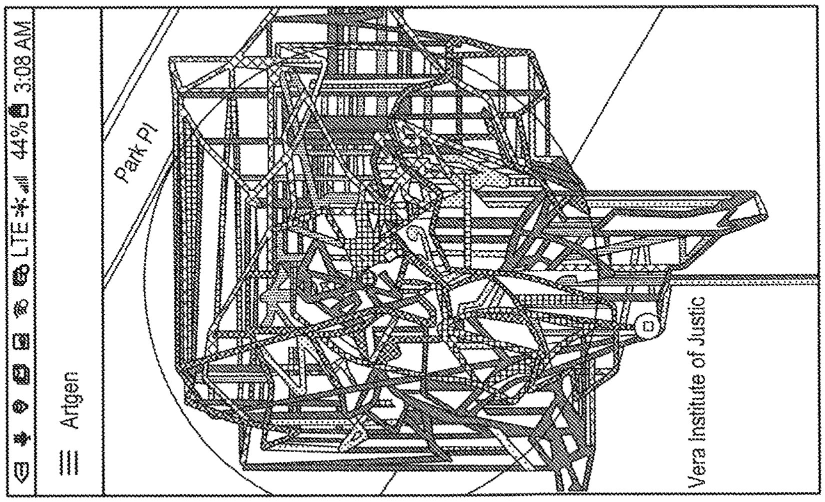

FIGS. 8A-8H show screen displays of different user traces for single users and in a draw together session. FIGS. 8A and 8B show representative traces for a single user over a plain background and also where that user has changed the selected color at various times. FIG. 8B also illustrates traces in which the position data points are connected in the trace using straight lines. FIG. 8C shows traces for multiple users in a draw-together session and who have selected different colors and shows the traces with two different perspectives. FIG. 8D is a trace showing a user in a building over a period of time. FIGS. 8E and 8F illustrate traces shown in a 3D perspective view over a plain background. FIG. 8G is a vertical view of a 3D trace shown with a map background. FIG. 8F is a perspective view of a 3D trace with an overlay of a 3D model of the associated geographic area.

Figure 2:
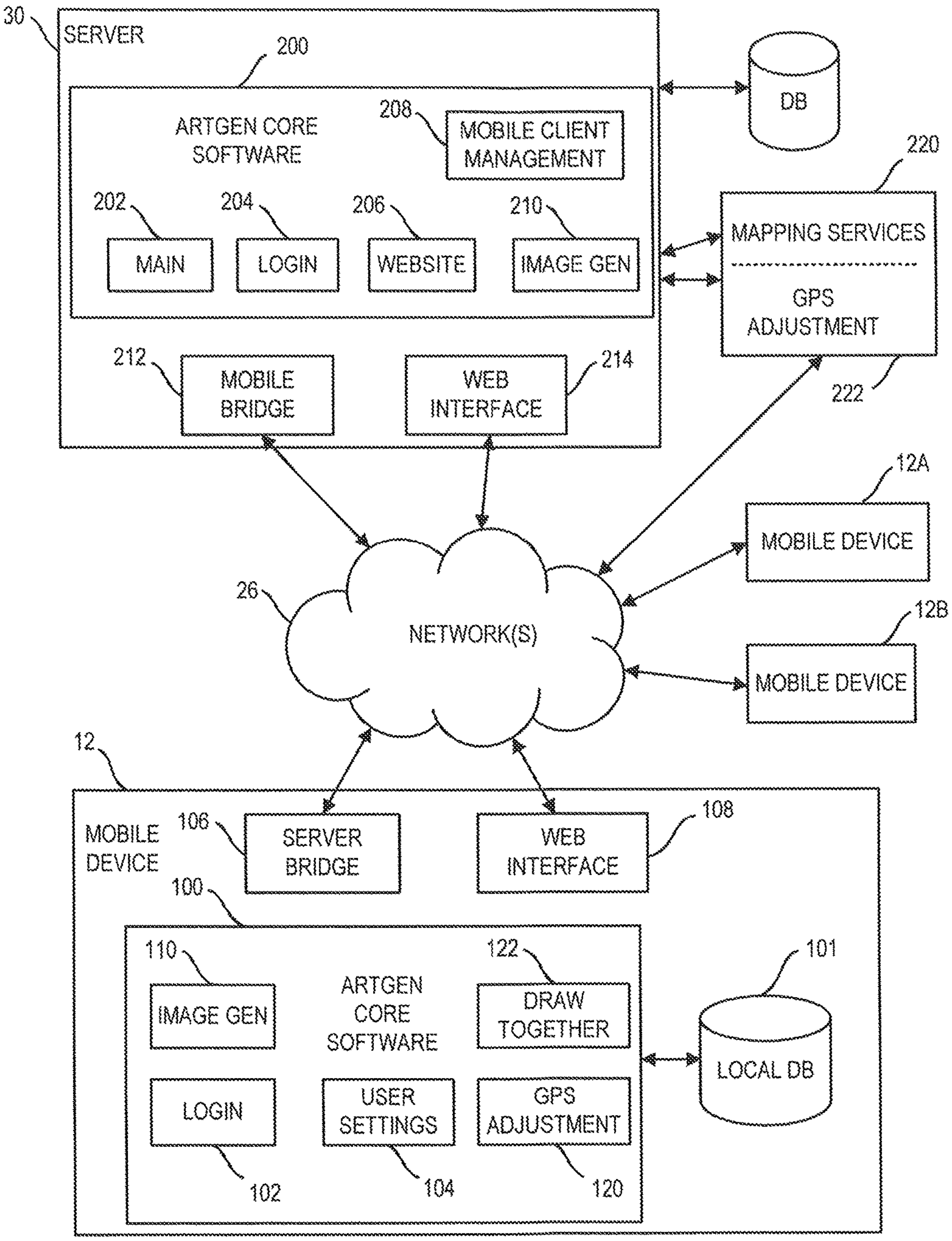
FIG. 2 is high level block diagram showing various major software modules for use in implementing an embodiment of the present invention.

A particular embodiment of aspects of the invention will be discussed with respect to FIG. 2, which shows a high level block diagram of various major software modules that operate in conjunction with the (not shown) underlying software operating system and other conventional software components for the mobile device 12. The mobile device 12 contains the core ARTGEN mobile software 100 and a local database 101 for storing user session and other data.

The mobile core 100 is comprised of several software modules. Login module 102 provides conventional functionality for the user to log-in to the program and connect with the remote server 30. An account sign-up can also be provided. A user settings module 104 is provided and through which the user can set various preferences and operating parameters including brush attributes (such as color and stroke width) and virtual canvas display options, such as whether to show a background map, include viewing interface elements on the trace display (such as rotate and zoom), and other user settings.

The mobile device 12 can preferably communicate in real or near-real time with the server 30 to send and receive data and make use of various server based functions. A conventional server bridge module 106 can be used to provide this functionality. A web interface 108, such as Windows Explorer™ or Apple's Safari™ can be provided to allow access to server functionality accessible via a web page.

The Image Gen module 110 provides functionality to convert position data and brush stroke parameter settings into a trace overlay on a virtual canvas. Various implementations for the image Gen module 110 can be used. In an embodiment in which the virtual canvas is a map, the Image Gen module 110 can utilize conventional mapping software APIs and map databases, such as are available through Google Maps™.

In some situations, GPS coordinate data may be adjusted before the data is used in generating a trace. This functionality can be implemented on the mobile device 12 or provided by a remote server, such as server 30. The reasons for adjustment can vary. For example, a trace may be confined to a specified geographic area and GPS coordinate data provided to the Adjustment module 120 in the mobile device. Adjustment module 120 can return converted coordinates for the nearest position along the border of the area. In a second and more preferred embodiment, a snap-to-roads feature is provided in which the raw GPS coordinate data is adjusted so that the trace is confined to specific geographic features, such as roads. Because of the data overhead for this feature, preferably this feature relies on a remote mapping system which stores the comprehensive maps. The raw OPS coordinate data is sent to the remote mapping services and adjusted coordinate is returned centered on the nearest road to the raw coordinates. Other data can be returned to the mobile device as well, such as the name of the road on which the coordinates have been centered. In a particular preferred implementation, the mapping service makes use of Open Source Routing Machine (OSRM) functionality for this coordinate adjustment. As discussed above, the Adjustment module 120 can also adjust the raw OPS coordinates based on external factors.

A further aspect of the invention is a 'draw together' feature in which the position data of multiple users can be combined, preferably in real time, to produce a joint and interactive display. The Draw Together module 122 provides functionality to support this feature. This feature is discussed further below.

Analogous to the mobile device 12, the server 30 contains the core ARTGEN server software 200. The core server software 200 is comprised of modules including a main program module 202, log-in and user sign-up functionality 204, and mobile client management 208. The server 200 can be accessed by mobile devices 12 via a mobile bridge module 212 compatible with the server bridge 206 on the mobile devices. The server 200 can also host a website 206 which can be accessed via web interface 214 and through which various functions can be provided to users. The database 32, which can be local to server 30 or accessed over a network, can be used to store user data such as log-in credentials, trace session data including coordinates and brush configuration, and other information. The server also can implement mapping services and GPS adjustment features internally. Preferably, however, external mapping services 220, such as Google Maps, is used for trace overlay on maps generation. For snap-to-road features, an external GPS Adjustment system 220, such as OSRM can be used.

Figure 3A:
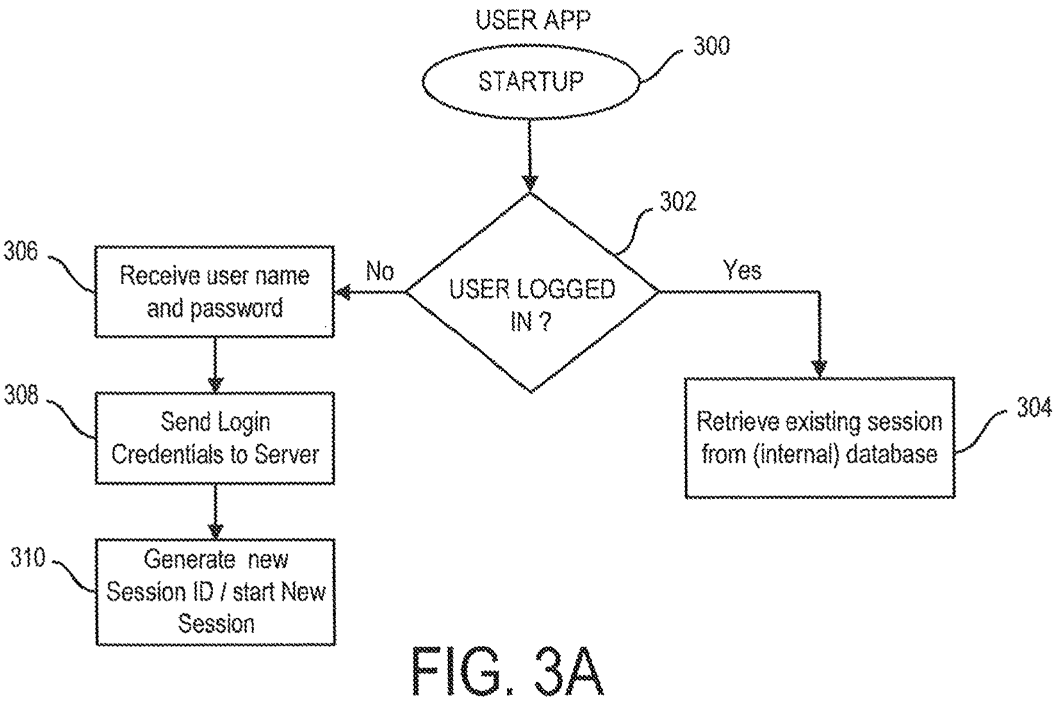
FIGS. 3A and 3B show high level flowcharts of the startup and user configuration of the App on a mobile device.

FIG. 3A shows the basic steps provided on the mobile device when the ARTGEN applications (the App) is initially started. Upon startup 300, the system checks to see if the user is logged in. (Step 302) If not, the user name and password is entered and the login credentials are sent to the server. (Steps 306, 308) If this is the first time the user has logged in, anew session is started and a new session ID is generated. The session ID used to uniquely define the session for that user. If prior sessions are stored on the server (or in the local database), the user may be given the option to select a session, download that to the mobile device if needed, and then resume that session. If the client is already logged in, data related to the most current drawing session can be retrieved from a database, preferably a local database maintained on the client device 12. (Step 304) If there are multiple drawing sessions available in the database, the user can be given an option of which session to select.

Figure 3B:
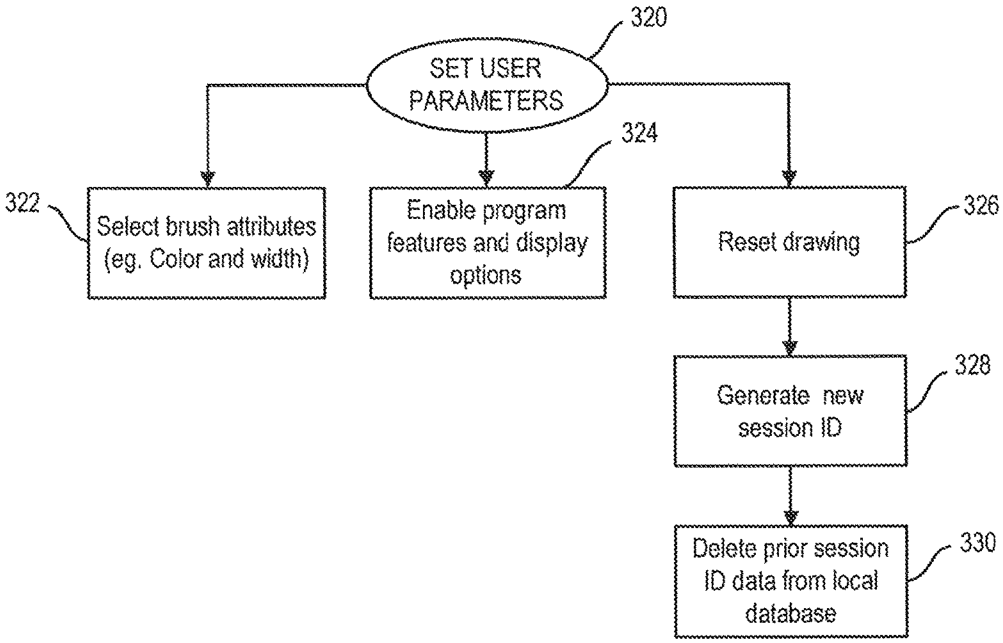
Figure 4:
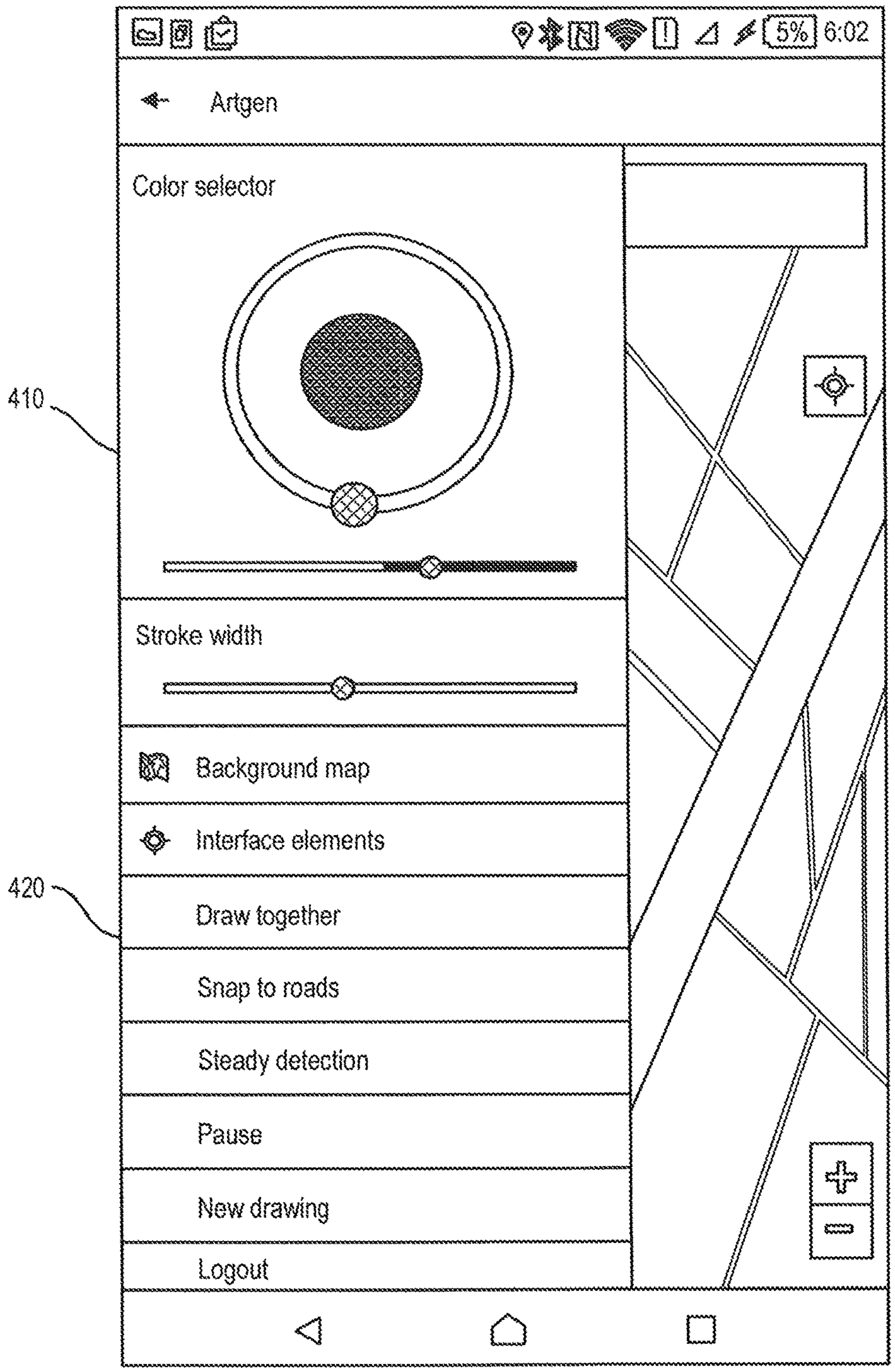
FIG. 4 shows an interface screen through which various mobile App parameters can be defined.

The App allows the user to define various user parameters as shown in FIG. 3B. The user can define the brush parameters used when generating the 'brush strokes' on the virtual canvas. The drawing parameters can include selection of brush color and stroke width. Other brush parameters which impact the way the traces are drawn can also be defined. (Step 322) The user can define various program features and display options used to control aspects of the trace generation and display. These features, discussed further below, include 'snap-to-roads', 'steady detection', and 'draw together'. The user can also start a new drawing session, upon which the current drawing and related data will be reset and a new session ID generated. (Steps 326, 328) The data associated with the prior session ID can also be deleted from the local database. (Step 330) FIG. 4 is an example of specific interface screen through which various mobile App parameters can be defined, including brush parameters 410 and program features and display options 420.

Figure 5A:
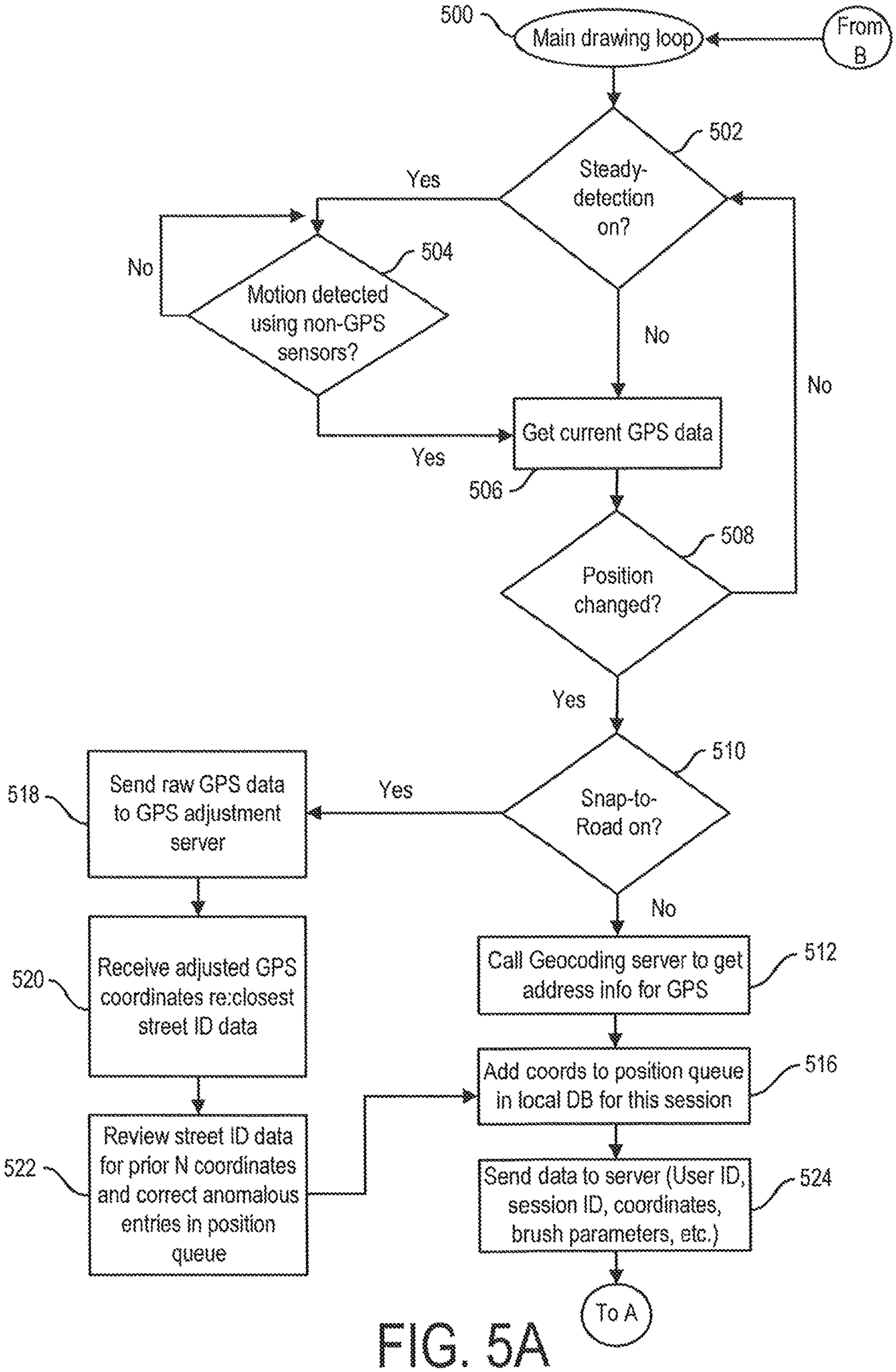
FIGS. 5A-5C are flowcharts showing functionality on the mobile device for a main drawing loop
Figure 5B:
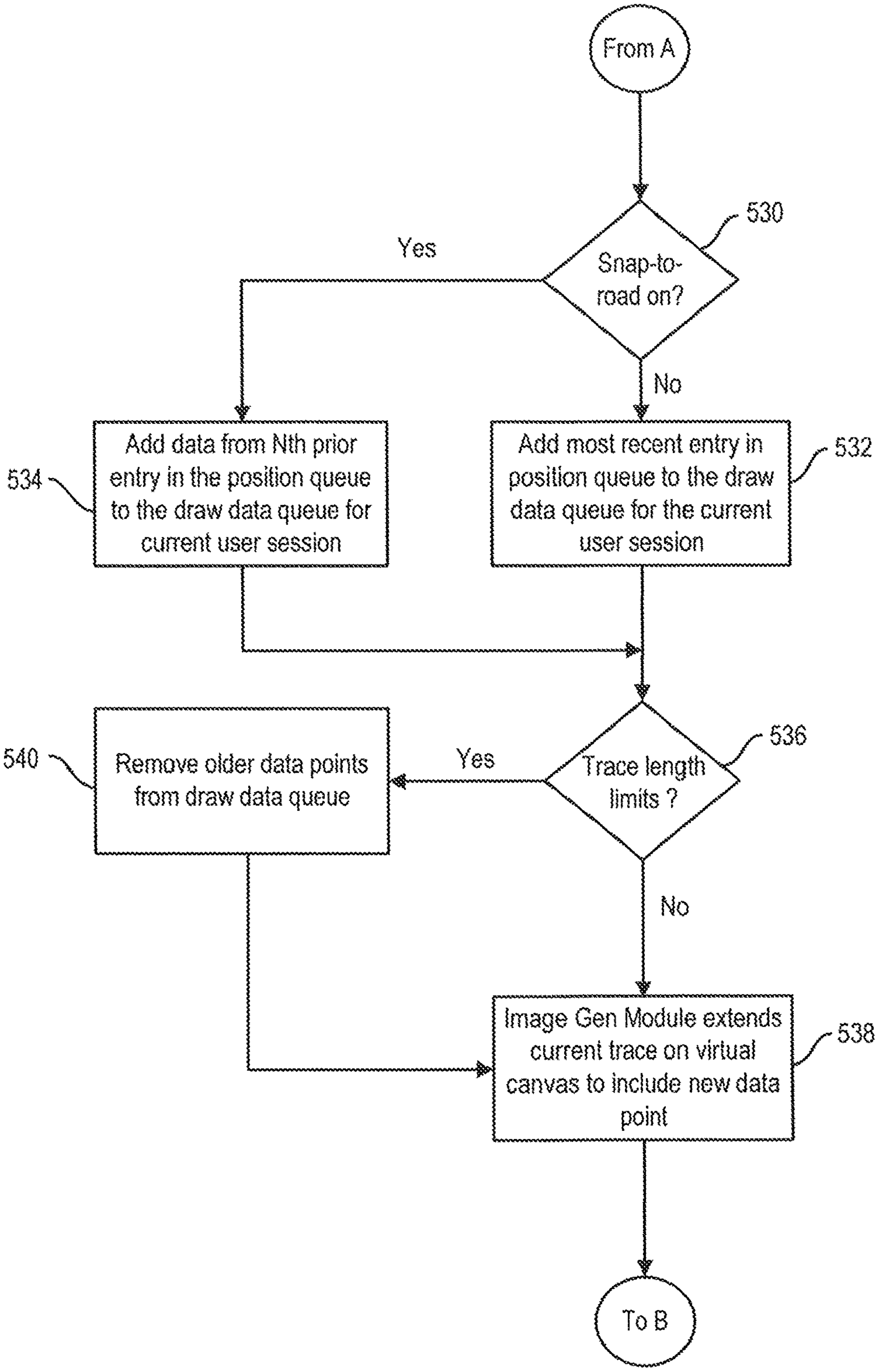
Figure 5C:
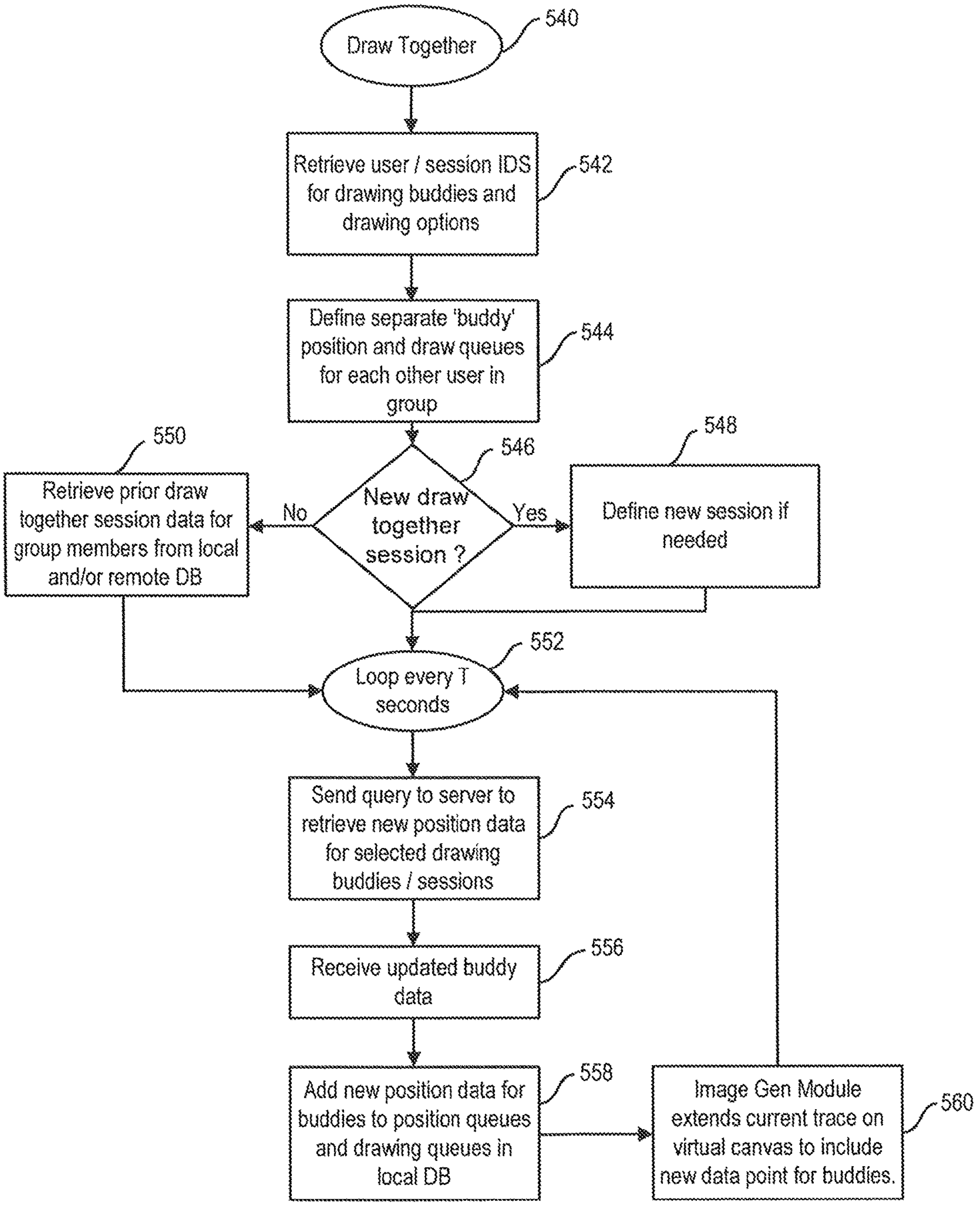

FIGS. 5A-5C are flowcharts showing functionality in a main drawing loop on the mobile device 12 during which the position of the mobile device and the user's brush attributes and other program controls are used to generate a trace on a virtual canvas. The main drawing loop for a single user is shown in FIGS. 5A and 5B. FIG. 5C shows additional functions used during a 'draw together' session.

Turning to FIGS. 5A and 5B, the initial step is to retrieve current GPS coordinates. In a simple embodiment, the GPS coordinates are simply retrieved from e GPS module in the mobile device. A 'steady-detection' function can be used to limit capture of GPS data to times when the mobile device 12 is known to be in motion so that there is no new drawing when the device is stationary. This helps avoid false readings that may cause random lines to be drawn due to a lack of precision and other errors in the GPS coordinate data. When "Steady Detection" is enabled, the mobile's devices internal accelerometer, gyroscope and/or other sensors are used to detect if the mobile device is steady or being moved. Activity or motion recognition APIs provided in current Android and Apple iOS operating systems suitable for this function.

After new GPS data is retrieved, it is compared to the prior coordinate data to determine if there has been any change. (Step 508). If not, the system waits for the next GPS data to be read. If the GPS data shows the device has changed position, the coordinate data can be processed for subsequent display. If the snap-to-road function is off (Step 510), the mobile device can call a geocoding server to retrieve address and other information for the current coordinate data. (Step 512). The coordinate information, and other information related to the user settings and possibly info from the geocoding server, is then added to a position queue for the current user and session. (Step 516). Data including the new coordinates and other information associated with the user can also be sent to the server 30 where it can be stored for later access by the user and/or distributed to other users (such as in a draw-together session).

If the snap-to-road is on (Step 510), the raw UPS coordinate data is sent to the UPS Adjustment server 222. This server will return adjusted UPS coordinates that are centered on the nearest road to the provided raw coordinates. Other data, such as the street ID, can also be returned. (Steps 520, 522). The street ID returned from the GPS Adjustment server 222 is not always accurate, particularly when a user is on or near the intersection of multiple roads. According to a further aspect of the invention, the street ID data for a prior N number of adjusted coordinates, such as five, are reviewed to determine if a prior entry is anomalous and should be corrected. For example, where Adam Street crosses over Baker Street, data showing a user traveling on Adam Street across Baker Street and continuing on Adam Street may be processed by the Adjustment server and indicate the user is on Adam Street before and after passing through the intersection but that they are on Baker Street when they are near the intersection. By reviewing a sufficient number of prior data points, the App can identify anomalies such as this and correct them as appropriate (such as by changing the ID from Baker Street to Adam Street) The (adjusted) coordinate positions can also be further adjusted to be consistent with this correction. (Step 522).

Turning to FIG. 5B, the position data from the position queue is added to a draw data queue containing the data points and other information actually used to generate the lines on the virtual canvas. If snap-to-road is off (step 530), the most recent entry in the position queue is preferably added to the drawing data queue for the current user session (step 532). If snap-to-roads is on (step 530), however, data from the Nth prior entry in the position queue is used. (Step 540). This allows the N top-most entries in the position queue to be checked for anomalies and corrected as appropriate and discussed above to avoid adding data with anomalies to the draw data queue.

The information in the draw data queue is then used by the ImageGen Module to generate the trace for the user session, making use of the appropriate brush attributes. (Step 538). The trace can be based on every position data point for the user during their session. Alternatively, the user can specify that the trace is limited, such as to a specified number of points or to points for a specified period of time. If such limits are defined (Step 536), these older data points can be removed from the draw data queue. (Step 540).

FIG. 5C is a flow chart addressing functionality in a Draw Together session in which the actions of multiple users are combined to create an interactive drawing or for other applications. When Draw Together is activated (step 540), the Draw Together session ID and the session IDs for the members (buddies) in the defined group are retrieved. If a new Draw Together session is started, a new session ID is defined. A trace can be generated for each of the users in the group and so separate position queues and draw queues can be specified for each group member for that Draw Together session. If a prior session is being continued, relevant data can be retrieved from the server for the various group members for that Draw Together session. (Steps 542-550).

After this initialization, the module enters a loop in which it queries the server 30 to retrieve new position data for the other users in the group for that session. Preferably, the server returns only the data more recent than specified timestamp, such as the time at which the request was made. (Steps 554, 556) (The position data for each user of the App can be continually sent to the server as per Step 524 in FIG. 5A). The received new position data for drawing buddies is added to the respective position queues in the local database (Step 558). The Image Gen module then processes this data to show updated traces for each of the users on the virtual canvas. (Step 560). Thus, drawings for each linked user in the group are overlaid and can be seen together by each member of the group in substantially real time.

A delay, such as of 5 seconds, is implemented before the loop is repeated. The delay can be selected to balance load placed on the mobile device each time data must be requested from the server and processed, and speed at which the system reacts to changes in position provided by other users in the group.

Figure 6A:
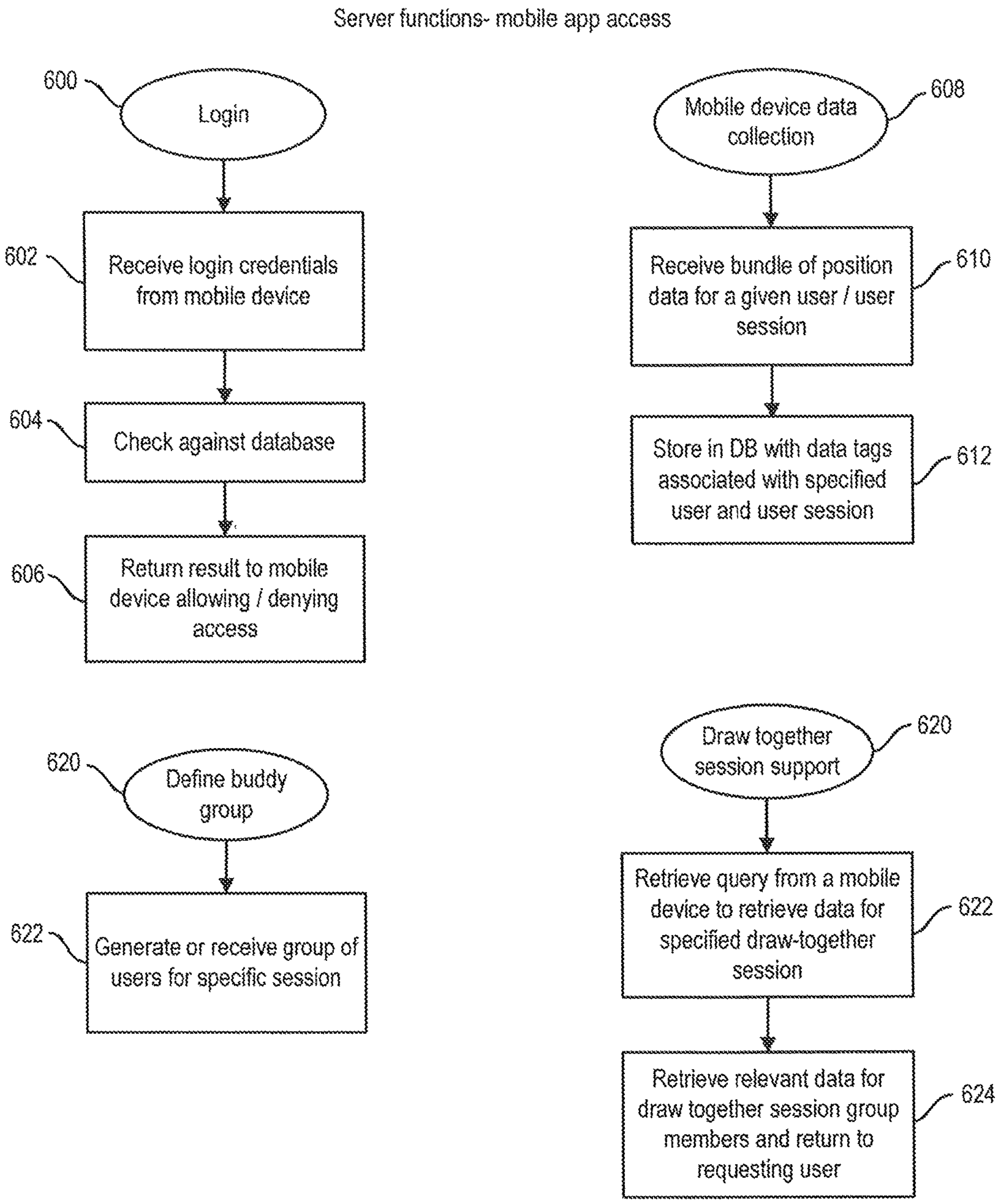
FIGS. 6A and 6B are flowcharts showing various functions implemented on the server according to aspects of the invention.
Figure 6B:
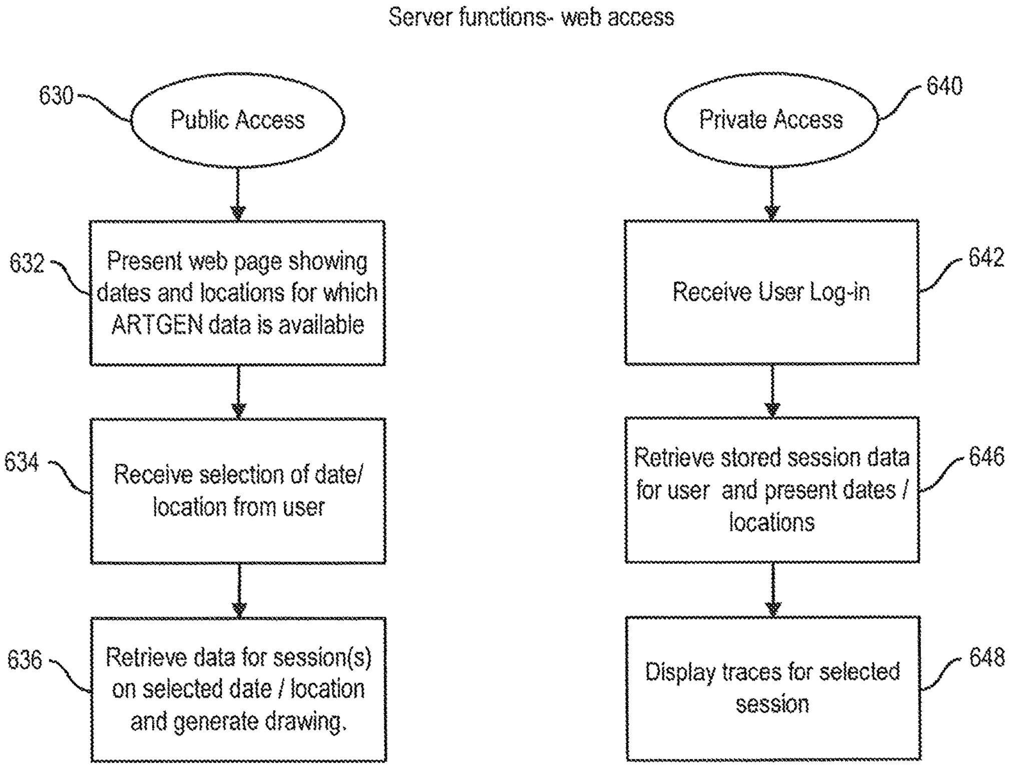

FIGS. 6A and 6B are flowcharts showing various functions implemented on the server according to aspects of the invention. In the login (608), conventional software is used to receive login credentials from a mobile device, check it against user info in the database, and then return info to the client regarding whether the login is successful. (Steps 602-606).

When mobile devices are operating, they periodically send updated user position data to the server. When these packets of data are received (step 610) they are stored in the database used by the server along with information needed to associate the data with specific users, user sessions, draw together sessions, etc. (Step 612). FIGS. 7A and 7B are examples of a representative entry in the database for a regular user session data point and from a Draw Together session for a particular implementation of the invention.

The server can also include functionality 620 through which a user can define a buddy group. The group members can be specified by a user or defined using other means, such as by identifying members who meet specified characteristics as discussed above. (Step 622).

When a user is involved in a Draw Together session, the user's device will periodically query the server to retrieve data for the other group members. When such a query is received (step 622), the relevant data is retrieved from the database and returned to the user (step 624). Preferably, the data retrieved and returned by the server is only of data which has a timestamp after a specified time.

In addition to access to the server using the App running on a mobile device, server access can also be provided through a web site interface. The access can be public or can be private requiring a login. Through this access, users can retrieve and view traces for themselves and for other uses at various dates and locations and discussed above. For public access, (630), a user can be presented with a web page showing a list of dates and locations for which ARTGEN data is available. (Step 632). A selection by the user of a specific date and location can be received by server (Step 634) upon which the server system retrieves data from one or more sessions for the selected data location and provides drawing of paths overlaid on specified background. (Step 636). A default setting can be specified to show all of the sessions for that day/location. Other options are also possible, such as random selection of one or more sessions for display. An opening screen before selection can show a drawing for a session from a randomly selected place, date, and zoom setting. Other options include showing a location from which the most recent data has been received, using cookies and other data from the user to determine the user's probable location and selecting closest ARTGEN location, etc.

A private login feature can be provided to allow users to access their own previously stored session data and other user features. After a user logon is processed (step 642), the system can retrieve data for that user from the database and present a menu showing, for example, the locations and dates where user session data and draw-together-session data for that user is available. (Step 646). The user can select a desired session and the session info can then be processed and used to generate an appropriate visual drawing. (Step 648). The drawing features implemented on the server can use similar functions and services as used on the mobile device.

While aspects of the invention have been discussed in the context of generating a drawing on a virtual canvas, the invention can also be used in various other contexts as well, some of which are addressed below.

In one embodiment, traces can be shown on a display at a museum of users who visit a certain gallery during a given period of time. The trace data is preferably updated in real time to provide an interactive display.

In a more complex embodiment, the trace of one or a small number of users in an initial trace set can be displayed. Other users can be added to the set when given conditions are met. In one example, a user is added to the trace set if they come within a specified distance of a user already in the trace set. As the various users in the trace set move around and interact with others, the number of users in the trace set increases and the complexity of and number of traces shown on the display likewise increase.

In yet a further embodiment, traces from different geographic areas can be overlaid during a modified Draw Together session. For example, if two public venues are running a simultaneous event, traces from users in each area can be shown simultaneously allowing for a multi-location interactive display. In implementation of this, coordinate data from each of the users would normalized to a local origin point and the trace data drawn relative to that local origin. Different scaling factors could also be applied, such as where one venue is much larger than the other but where the overlays should have the same apparent size.

Other variations in how the trace is displayed are also contemplated. For example, the width of the trace line or the saturation of the selected color can be varied automatically according to certain parameters, such as speed at which the user is moving, local temperature, number of other users whose traces are being shown, etc. In a particular example, the width of the trace line can be inversely proportional to the speed at which the user is moving so that the faster the user is going, the thinner the line and the longer the user has stayed put, the fatter the trace line appears. In another example, the saturation of the selected color can be increased or reduced depending on how much the user has been moving around over a prior time interval. Using these features, the line thicknesses and color intensity can provide an indication of the general level of physical activity of the various users whose traces are shown.

Although the invention is primarily focused on a visual display, non-visual outputs are also contemplated. For example, an audio or haptic signal can be given when a user's trace crosses over the trace of another user. The signal can further be adjusted based on how old the point of intersection on the other trace is. Similarly, a user can select the sound to be played when someone else crosses their trace.

In other alternative embodiments, the App can include sound and instruments so that music can be generated in the same easy way as it now works with colors. For example a performance artist can use the App to generate music by linking varying sounds and/or instruments to the movement of the participating dancers. Each dancer could then become, in effect, a musical instrument. In this manner, interactive orchestral arrangements can be generated.

In addition, users can add images and short movie clips to their trace. These media files can be stored in the database along and associated with position data and the system can be used for a local or global platform for interactive live paintings, orchestral music composition, poetry, etc. In one embodiment, when the trace is shown, an icon can be displayed adjacent the trace at a given location indicating that a media file associated with that location is available to be played. Selecting the icon would play the file. In another embodiment, media files uploaded by other users at a given location can be played when a user crosses their trace and is within a specified distance from where the media file was recorded. Other variations are also possible.

The embodiments discussed above make use of a wireless data connection on the mobile device to send and receive data to and from the server and to access remote functionality. According to a further aspect of the disclosed methods and systems, if such a data connection is not available, such as an 'Airplane mode' or a location where there is no WiFi or cellular signals, the mobile device can save the GPS data locally. Depending on the mapping data and GPS Adjustment functionality available on the mobile device, display of the trace overlaid on a map and adjustment of raw GPS coordinates, such as for snap-to-road, may disabled during the time the wireless data connection is unavailable. When the mobile device returns to an area where a wireless data connection is available (or the wireless connection is enabled), the App can send the collected data in bulk to the server. The raw GPS data can also be processed in bulk to make GPS adjustments at that time.

In a further embodiment, the invention can be used for entertainment and interactive games. For example, the location and trace data can be used to simulate games in which a player has to take a path that avoids crossing their own trace or the trace of another player. A multi user game could be implemented analogous to 'light cycle' game from the movie Tron. Each player could have a cell phone or other computer to display the traces of all the players. Players would try to take a path that avoids crossing the trace of other players while forcing other players to intersect a trace. A single user game analogous to the game "worm" could be implemented in which a user's trace increases in length over time, either automatically or after a given event. Such a game could be combined with other activities. For example, the user could be challenged to walk through a museum exhibit without crossing their path or intersecting virtual 'walls' to thereby encourage users to view an entire exhibit. Users who succeeded could be given a reward, such as a discount coupon at a gift shop.

In yet another embodiment, a displayed trace can be selected and information related to the user associated with that trace displayed. For example, a user can define a public profile that is stored in the server 30 or database 32. If their trace is shown on a display and selected, aspects of their profile may be shown. If a user has an associated e-mail address or social network ID in their profile, then when another person selects their trace, the individuals can be given the option to communicate with each other.

The invention can be implemented in software for cell phones, tablets and wearables, such the Apple iPhone, iPad, Apple Watch, Android phones, tablets and watches, and on standard computer systems using conventional programming techniques known to those of skill in the art.

While it is preferred that the position collection be done on behalf of individual users using their cell phones, in an alternative embodiment, users can be given tags with RFID chips or other known mechanisms that permit the location of the tag to be determined using external equipment. A computer collects the determined position data for the multiple tags and stores it, e.g., in the position database 32. The trace information can then be displayed in a manner as discussed above. In this embodiment, people attending an event, such as an art gallery or museum, can be given a position tag when they enter the event and either be assigned a color or select one via a suitable interface. The location of each of the tags is determined during the course of the event and an interactive display of traces for the people attending the event can then be shown without requiring the attendees to install the App on their phones.

Various aspects of the invention have been disclosed and described herein. Various modifications, additions and alterations may be made to the invention by one skilled in the art without departing from the spirit and scope of the invention. For example, the invention can be easily modified for use in other human interactions such as meet-ups.

The invention claimed is:

1. A method for generating a visual display on a virtual canvas comprising the steps of: receiving in a portable computing device at least one set of brush parameters for a user; receiving a plurality of location coordinates having timestamps and corresponding to positions of the device over time; generating a plurality of location data points corresponding to at least some of the location coordinates, each location data point being associated with a particular brush parameter set, wherein different location data points can be associated with different brush parameter sets; and generating a visual display on the portable computing device comprising a virtual canvas with at least one overlaid brush stroke trace, the trace having a geometric path dependent on at least a portion of the plurality of location data points and a value of at least one external factor unrelated to portable computing device position and having visual attributes determined by the brush parameters associated with the plurality of location data points.

2. The method of claim 1, wherein the step of generating a plurality of location data points comprises adjusting location coordinates in accordance with predefined criteria.

3. The method of claim 1, the virtual canvas comprising a digital map of a region encompassing at least some of the location coordinates and specifying the location of roads;

the step of generating a plurality of location data points comprising the steps of:

sending location coordinates to a mapping service; and receiving corresponding adjusted location coordinates from the mapping service, each adjusted location coordinate substantially corresponding to the midpoint along a road closest to the associated location coordinate.

4. The method of claim 3, further comprising the steps of:

receiving from the mapping service names of the roads to which the adjusted location coordinates have been adjusted;

examining a plurality of adjusted location coordinates and associated road names to identify road name anomalies; and correcting the road name anomalies.

5. The method of claim 4, wherein the mapping service is remotely located from the device.

6. The method of claim 1, further comprising the steps of defining a session ID; and sending user trace information associated with the session ID to a remote server, the user trace information comprising the plurality of location data points and brush parameters associated with the plurality of location data points.

7. The method of claim 6, further comprising the step of receiving from the remote server previously stored user geometric information associated with the sessions ID; wherein the geometric path is further dependent on at least a portion of the previously stored user trace information received from the remote server.

8. The method of claim 1, wherein the external factor comprises one or more of weather information, financial market information, political volatility data, time of day, and a random value.

9. The method of claim 1 wherein the location coordinates are received from a GPS unit associated with the device.

10. The method of claim 9 wherein step (a) further comprises adjusting the local location data point in accordance with predefined criteria and step (c) further comprises adjusting the remote location data point in accordance with predefined criteria.

11. The method of claim 10, the virtual canvas comprising a digital map of a region encompassing at least some of the local location and remote location data points and specifying the location of roads;

the steps of adjusting the local location data point and adjusting the remote location data point each further comprise sending the respective location data point to a mapping service and receiving the adjusted location data point from the mapping service.

12. The method of claim 11, further comprising the steps of:

receiving from the mapping service names of roads to which the adjusted location data points have been adjusted;

examining a plurality of adjusted location coordinates and associated road names to identify road name anomalies; and correcting the road name anomalies.

13. A method for generating a visual display on a virtual canvas comprising the steps of:

receiving in a portable computing device associated with a local user at least one set of brush parameters for the local user;

receiving a plurality of location coordinates having time-stamps and corresponding to positions of the portable computing device over a first time period;

local trace information comprising a plurality of local location data points corresponding to at least some of the location coordinates, each location data point being associated with a particular brush parameter set for the local user, wherein different local location data points can be associated with different brush parameter sets;

receiving from a remote server remote trace information associated with at least one remote user of a corresponding remote computing device, the remote trace information for each said remote user comprising a plurality of remote location data points for that remote user over the first time period, each remote location data point being associated with a particular brush parameter set for a corresponding remote user, wherein different remote location data points for a respective user can be associated with different brush parameter sets;

(a) generating a visual display on the portable computing device, the visual display comprising the virtual canvas with a plurality of overlaid brush stroke traces including at least a first overlaid brush stroke trace for the local user and an overlaid brush stroke trace for each remote user, each trace having a path dependent on at least a portion of the respective trace information and having visual attributes determined by the brush parameters associated with the respective plurality of location data points;

(b) receiving an updated local location data point;

(c) receiving an updated remote location data point for the at least one remote user; and repeating steps (a)-(c) on a recurring basis using local trace information further comprising the updated local location point and remote trace information further comprising the updated remote location data point.

14. The method of claim 13, wherein the local user and each said remote user are associated with a predefined group;

the method further comprising the step of sending to the remote server a group session ID associated with the predefined group; and the remote trace information received from the remote server comprising trace information associated with the predefined group and group session ID.

15. The method of claim 13, wherein the local trace information and remote trace information are normalized to a common origin prior to generating the visual display.

16. The method of claim 13, wherein the location coordinates are received from a GPS unit associated with the device.

17. The method of claim 13, wherein the step (a) of generating a visual display on the portable computing device further comprises the step of generating the visual display on a computer screen separate from the portable computing device.

18. The method of claim 13 further comprising the steps of sending the local trace information to the remote server; and providing access to the visual display through an internet web page interface at the server.

19. A method for generating a visual display on a virtual canvas comprising the steps of:

defining a local data queue for a local user;

defining for each remote user in a group of at least one remote users, a corresponding remote data queue;

receiving in a portable computing device at least one set of brush parameters;

(a) receiving a local location data point corresponding a position of the portable computing device at a given time, the local location data point being associated with a particular brush parameter set, (b) adding the local location data point to the local data queue;

(c) receiving, a remote location data point for a user in the group, the remote location data point being associated with a particular brush parameter set;

(d) adding the remote location data point to the remote data queue for that user;

(e) generating a visual display on the portable computing device comprising a virtual canvas with a local overlaid brush stroke trace having a path dependent on the local location data points in the local data queue and having visual attributes determined by the brush parameters associated with those location data points, and a remote overlaid brush stroke trace for each user in the group and having a path dependent on the local location data points in the respective remote data queue and having visual attributes determined by the brush parameters associated with those location data points;

(f) repeating steps (a) through (e) on a recurring basis for subsequently received local data points and remote data points.

* * * * *